March 1, 1966   R. F. TILGNER   3,237,234
POWER DRIVEN CUP BRUSH
Filed July 24, 1963   3 Sheets-Sheet 1
FIG. 1
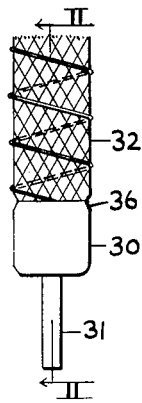
FIG. 2
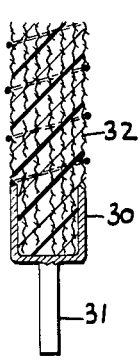
FIG. 4
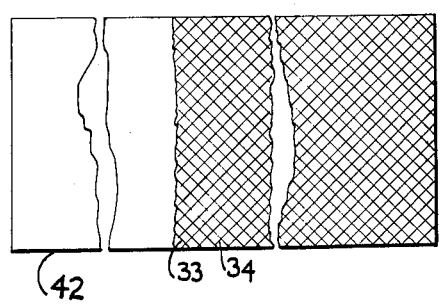
FIG. 3
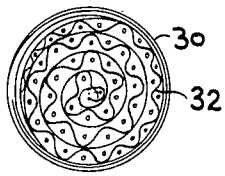
FIG. 5
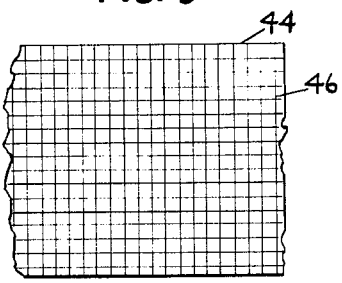
FIG. 6
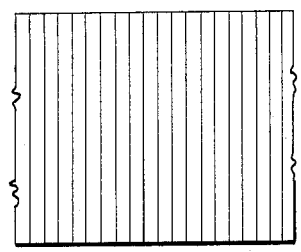
FIG. 7
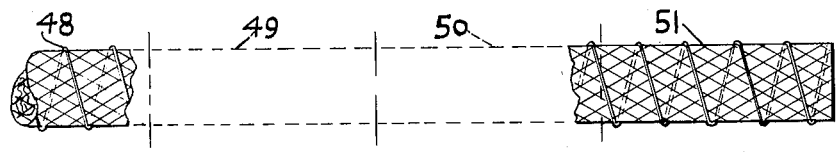
FIG. 8   FIG. 9   FIG. 10
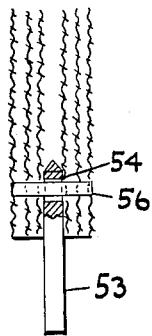 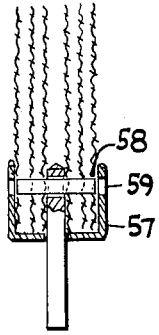 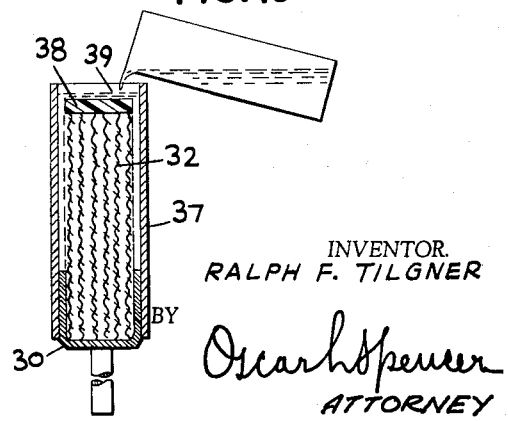
INVENTOR.
RALPH F. TILGNER
BY Oscar H Spencer
ATTORNEY March 1, 1966  R. F. TILGNER  3,237,234
POWER DRIVEN CUP BRUSH
Filed July 24, 1963  3 Sheets-Sheet 2

INVENTOR.
RALPH F. TILGNER
BY Oscar h Spencer
ATTORNEY

March 1, 1966  R. F. TILGNER  3,237,234
POWER DRIVEN CUP BRUSH

Filed July 24, 1963  3 Sheets-Sheet 3

INVENTOR.
RALPH F. TILGNER
BY Oscar L. Spencer
ATTORNEY

United States Patent Office 3,237,234
Patented Mar. 1, 1966

3,237,234
POWER DRIVEN CUP BRUSH
Ralph F. Tilgner, Ellicott City, Md., assignor to Pittsburgh Plate Glass Company, Pittsburgh, Pa., a corporation of Pennsylvania
Filed July 24, 1963, Ser. No. 297,304
2 Claims. (Cl. 15—200)

This invention relates to wire brushes adapted for use as an abrading tool, and it has particular relation to power-driven brushes wherein the brush is of circular section and is adapted to be rotated about an appropriate longitudinal axis to provide an abrading tool.

It has heretofore been disclosed to form brushes wherein the fill material is composed of strands of wire bunched together into a bristle portion or tuft suitably held in a holder which may be power-actuated. One of the more common brushes of this type comprises so-called end brushes wherein the strands of wire are doubled about a suitable locking element disposed within a confining and driving element. Such brushes are illustrated in United States Patents Nos. 2,982,983 and 2,449,158.

Still another brush of somewhat similar design comprises the so-called cup brushes wherein tufts of bristle material are held in a perforated ring within a cup and the flexible tips are allowed to project more or less axially. This type of brush is illustrated in United States Patent No. 2,062,047. A disadvantage of the constructions as illustrated in the patent resides in the fact that the fill material is obtained in the form of bunches of wire which require bending about holding elements, in some instances, as a series of individual tufts. Obviously, this is a difficult, time consuming operation for commercial purposes. Also, it will be apparent that the individual wires are left free to flex and bend unrestrictedly at their tips, and if the brushes are driven at high speed, there is a strong tendency for the tip portions to flex outwardly, thus giving the brush a distorted section not at all suitable for many abrading operations. Furthermore, in event that one of the individual filaments constituting the fill material becomes broken, the detached portion is free to fly outwardly under centrifugal force and is lost. It may constitute a hazard to personnel or to apparatus or products disposed in the vicinity. Needless to say, the loss of a number of filaments by breakage imposes an added strain upon the filaments remaining unbroken and in place.

This invention contemplates the provision of a resultant article wherein the foregoing difficulties are obviated. In its essence, the invention contemplates the provision of brushes of the power-driven type having wire fill wherein the individual filaments are associated together appropriately into a fabric which can be readily assembled to provide a tuft or fill mass with a minimum of effort, as for example, by coiling, and which can be appropriately mounted in a holder upon a suitable driving shaft or other device for holding and operating the construction as a power-driven tool.

As a still further feature, the invention contemplates the embedment of the fill material or the encasement of said material in a suitable plastic medium which is designed to hold the individual filaments firmly in place, but is resilient in that it can withstand shock without permanent deformation or rupture. Further, this plastic medium should be preferably adapted to wear gradually away at a somewhat faster rate than the tips of the fibers constituting the fill, thus providing a brush structure wherein, in effect, the fill is quite short and stiff, but which does not vary appreciably in length throughout the period of service of the brush. Further, the plastic material may be used to firmly secure the fill material to an appropriate holder or driving device without encasing the entire fill, thus permitting part of the fill to extend beyond the plastic or holder in a conventional manner.

For a better understanding of the invention, reference may now be had to the accompanying drawings wherein like numerals refer to like parts, and wherein FIGURE 1 is a side view of a brush of the end type constructed in accordance with the provisions of the present invention.

FIGURE 2 is a sectional view substantially upon the line II—II of FIGURE 1.

FIGURE 3 is an end view of the construction illustrated in FIGURES 1 and 2.

FIGURE 4 is a fragmentary view of a strip of wire fabric wherein the filaments of the warp and weft are disposed on a bias with respect to each other.

FIGURE 5 is a fragmentary sectional view of a portion of wire fabric adapted to be coiled to form a brush tuft or bristle portion, but wherein the warp and weft are square woven.

FIGURE 6 is a fragmentary view of a small portion of a strip adapted to be coiled wherein parallel filaments of wire fill material are held together by embedment in plastic to provide a sheet, portions of which can be coiled to form a brush tuft or bristle portion.

FIGURE 7 is a side view of an elongated roll of wire fabric which can be cut into short sections, thus providing a series of individual brush tufts.

FIGURE 8 is a fragmentary sectional view of a tuft or bristle portion secured upon a stem by a transverse pin so that the unit can be inserted in a cup.

FIGURE 9 is a sectional view of a brush embodying the tuft of FIGURE 8, but being mounted in a cup to provide a finished structure.

FIGURE 10 illustrates a method of embedding the wire fabric tuft in plastic.

Figure 11:
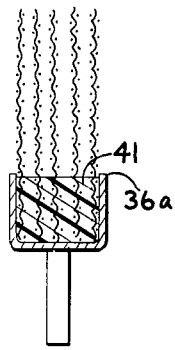
FIGURE 11 is a sectional view of a brush wherein the tuft or bristle portion is formed as a roll and is inserted in plastic disposed in a cup.

In FIGURE 1 is illustrated a brush of the end type wherein the bristle or tuft is formed by spirally winding a piece of wire fabric. In this construction, the cup element is substantially conventional and may, for example, be of the type illustrated in United States Patents Nos. 2,982,983, and 2,449,158. The cup portion is illustrated at 30 and comprises a stem 31 adapted to be clamped in a chuck of the driving device, such as a drill press or the like having a suitable power drive. The tuft portion 32 is formed of wire or iron; steel, including stainless steels; or other hard metals which may be similar to screen wire, and is spirally wound in the manner indicated in FIGURE 3 of the drawings.

If the wire of the fabric is too soft for satisfactory performance, the roll or tuft may be subjected to heat hardening as by carburizing or case hardening in a molten sodium cyanide bath or the roll may be subjected to nitriding in contact with hot, disassociated ammonia. The "case" on the wire may be superficial or may be as deep as desired. The entire depth may even be penetrated.

The wire is illustrated in FIGURE 1 as being cut on a bias, but it may also be square cut as in FIGURE 5. Advantages of the bias cut reside in the fact that the tips of both the warp and weft filaments are exposed to provide cutting action. The bias cut fabric is illustrated in FIGURE 4 wherein one set of filaments 33 (warp), whereas the cross filaments 34 (weft) are woven thereacross in the usual manner. As illustrated in the drawings, FIGURES 1 and 4, the spacing of the filaments is sufficient to leave substantial interstices therebetween. Obviously however, the spacing may be of substantially any dimensions. The roll of wire fabric as shown in FIGURE 1 is inserted in the cup element 30 and the edges of the latter are inwardly pressed as at 36 more firmly to grasp the roll and thus to prevent the latter from being displaced.

The filaments constituting the fabric preferably, though not necessarily, are embedded in a plastic bonding medium, such as polyethylene, polybutylene, polystyrene, polyvinyl chloride, nylon or the like. Most of these are thermoplastic resins and may be incorporated while in fused condition into the meshes of the fabric. The use of non-thermoplastic resins is also contemplated. For example, the roll of fabric indicated at 32 may be embedded in a thermosetting resin, such as a copolymer of a polyester of an alpha, beta-ethylenic dicarboxylic acid and a dihydric alcohol with a monomer, such as styrene or diethyl acrylate or the like. Other thermosetting plastics utilizable in the invention include epoxy resins, melamine-formaldehyde resins, phenol-formaldehyde resins and the like. Impregnation of the roll of fabric may be effected by dipping the roll in molten or dissolved resin as a preliminary operation before the roll is inserted in the cup 30. It is also contemplated to inject liquid resin-forming material at the end of the roll and to allow it to permeate along the length thereof.

In FIGURE 10 it is disclosed to insert the butt end of the roll 32 into the cup 30 and then to pour liquid resin around this roll. In order to conduct this operation, the assembly comprising the cup 30 and the roll 32 may be inserted at the bottom end of a mold, such as a piece of flexible rubber or plastic tubing 37, which fits snugly around the cup element 30. If desired, the upper edge portions of the wire fabric may be covered by a disc 38 of a foamed material, such as a foamed polyurethane resin, which at least superficially embeds the tips of the projecting wires sufficiently to prevent them from becoming covered with resinous material. The molten or liquid resin, as prevously described, is poured into the cavity 39 at the top of the disc 38 and percolates downwardly around the sides of the roll and also tends to permeate into the interstises of the fabric comprising the roll.

If desired, the roll or butt end of the roll may be embedded in the manner indicated in FIGURE 11 in a liquid or fused plastic material 41 which may be poured into the cup as a preliminary to the insertion of the butt end of the roll. The liquid plastic material permeates upwardly between the convolutions of the fabric and flows between the interstices firmly to anchor the roll in place within the cup. The crimping of the edges as at 36a further increases the strength of the anchorage of the roll in the cup. The resin at 41 may be the same as that surrounding and permeating through the interstices of the roll indicated in FIGURES 1 and 2. If preferred, the resin at 41 may be an epoxy resin which is formed by interpolymerization of bisphenol A and epichlorohydrin in well-known manner.

As shown in FIGURE 4, the strip of fabric may be adhered to or laid upon a strip-like sheet of plastic material, as indicated at 42, so that when the fabric is rolled up, the plastic material is correspondingly rolled thereinto. If desired, the brush units, such as are illustrated in FIGURES 1 and 2, may be heated for purposes of fusing the resin and causing it to embed the filaments comprising the fabric. This method is admissable with thermoplastic resins, such as polyethylene, polybutylene polystyrene or the like. As shown in FIGURE 4, the plastic strip is provided with a projecting end portion which may be of sufficient length completely to pass around the outside of the inner roll comprising the wire fabric. The covering thus provided may be subjected to heat in order to fuse the plastic to the wire beneath and to fuse the end portion of the tab upon the layer beneath, thus providing a monolithic covering about the roll.

If desired, the wire fabric may be of square weave of the type indicated in FIGURE 5 of the drawings wherein the warp filaments 44 are crossed at right angles by the weft filaments 46. This fabric may be used without the plastic backing material, if desired, the roll being formed without embedding plastic or, if preferred, the plastic may be injected at a subsequent stage in the assembly of the brush units.

As shown in FIGURE 7 of the drawings, bristle portions or tufts may be formed of a single length roll 48 of wire fabric with or without a sheet of plastic material incorporated therewith. This roll may be of a length to form a plurality of bristle tufts. In order to provide lengths suitable for use in cups 30, the roll is cut into sections 49, 50, 51, etc., of correct length. The cutting operation conveniently may be performed by grinding, sawing, shearing or the like. An advantage of forming this unit resides in the fact that the edge portions at the points of cutting will be substantially square, thus obviating the necessity of trimming the end portions in the composition of the brush unit. It will be recognized that the roll illustrated in FIGURE 7 may be formed of bias cut fabric or of square woven fabric, such as is illustrated in FIGURE 5. It may include embedding plastic in the fabric in a form or a mold, or embedment may be effected by injecting liquid plastic at a subsequent stage.

In the preceding discussion, reference has been made to the securing of the roll of wire fabric in the cup by means of a plastic medium embedding the butt portion of the roll. However, in FIGURES 8 and 9 is disclosed a different system of securing the roll in place in the cup. For example, in the construction as shown a stem element 53 is inserted coaxially of the roll. This stem is provided with a transverse hole 54 which may be of substantial size, and a transverse locking pin 56 is driven through the roll and through the hole, thus to secure the stem 53 in place. The stem may be inserted in a hole in the bottom of a cup element, such as the element 57. The locking pin construction provides a positive direct drive between the roll and the stem. If preferred, cement may also be incorporated as at 58 about the butt portions of the roll. It will be manifest that the roll may also be inserted in the cup and the holding pin 56 may then be driven in place as, for example, through holes 59 in the side of the cup.

Figure 12:
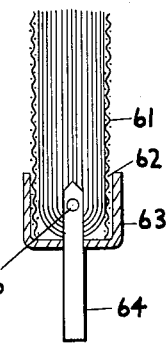
FIGURE 12 is a sectional view of a brush unit comprising an outer casing of fabric containing an inner tuft of fill composed of loose wire filaments corresponding to those of brushes as heretofore employed.
Figure 13:
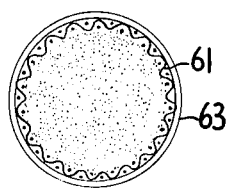
FIGURE 13 is an end view of the construction as shown in FIGURE 12.

In FIGURE 12 is shown a composite brush construction wherein the tuft or bristle portion is provided with an outer casing of wire fabric with or without plastic medium embedding the filaments thereof, and with a core of conventional wire fill material wherein the individual strands are bunched together without interweaving and are bent around a pin in a driving stem. In this construction, wire fabric is indicated at 61 and is embedded in plastic as at 62 to provide a hollow cylinder which fits within a cup element 63 having a hole in the bottom thereof for the insertion of the stem element 64. The pin 66 extends through a hole in the upper end of this pin or, if preferred, it may be merely welded thereto. This type of construction (without the outer casing) is illustrated in United States Patent No. 3,007,188 to Dolan. An advantage of this construction resides in the fact that the relatively hard, springy wire can be used as a fill material for the interior of the brush. The outer casing of woven wire retains the ends of the fill material in closely compacted relationship even at high rotational speeds. However, the casing wears away as the tips of the fill material wear away. The tips of the filaments constituting the fabric of the casing act to provide cutting action, thus assuring a maximum of effective material in the construction. If preferred, liquid resin or resin solution may also be injected or otherwise incorporated into the strands of fill material within the outer casing.

Figure 14:
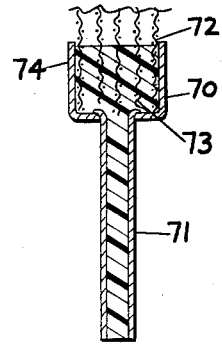
FIGURE 14 is a sectional view of a modified cup brush construction embodying the wire fabric fill of this invention.

In the construction shown in FIGURE 14, the cup element 70 is provided with a hollow or tubular stem 71 in which the butt portion of a roll of wire fabric is inserted, as at 72. Plastic material to embed said butt portions may be injected into the cup by pressure through the hollow stem 71. The upper end of the stem may be flared, as at 73, to assure that the stem is held from displacement. Obviously, the upper edge of the cup 70 may be inwardly rolled, as at 74, in order to increase the anchorage of the active element 72 within the cup.

Figure 15:
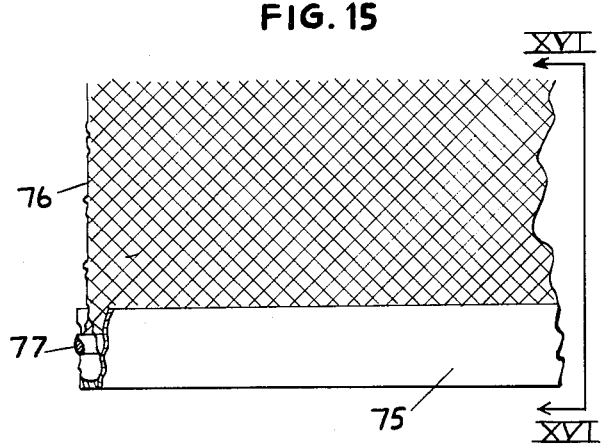
FIGURE 15 illustrates the use of a wire fabric as a fill material for a conventional spirally wound brush.
Figure 16:
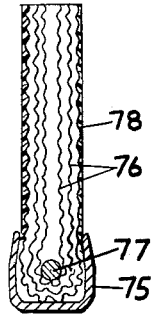
FIGURE 16 is a sectional view taken substantially along the line XVI—XVI of FIGURE 15.
Figure 17:
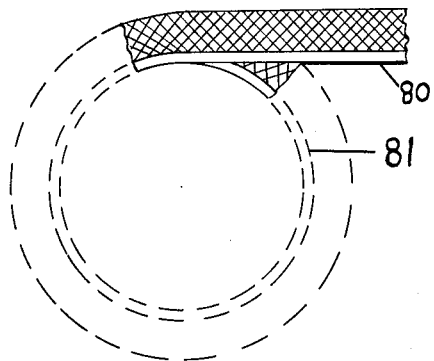
FIGURE 17 illustrates the coiling of the brush strip of FIGURES 15 and 16 into a spirally wound brush.

In FIGURES 15, 16, and 17 are illustrated the applications of the wire fabric as fill material for use in a spiral wrap strip brush. In this construction, a channel backing 75 is provided and in this channel are disposed one or more layers of wire fabric, as indicated at 76. The layer or layers are doubled about a longitudinal core element 77 of conventional type. The fabric may also be associated with a plastic layer 78 designed to embed the fabric and to fill the interstices thereof. The strip element is preferably formed as a strand unit 80 and this unit is circularized or wound upon a driven core 81, as many convolutions as desired being wound into place in well-known manner to provide a cylindrical brush of any desired length. The strip of wire fabric as employed in this construction may be either of square weave or may be cut on a bias in the manner already described.

Figure 18:
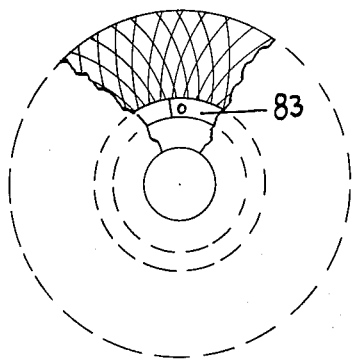
FIGURE 18 illustrates the use of the wire fabric fill material of this invention in a conventional brush section such as a plurality of which may be employed in a gang upon a mandrel in forming a cylindrical brush.

In the construction illustrated in FIGURE 18, a brush section of circular design is provided and a plurality thereof may be assembled upon a suitable driving mandrel or drum in order to provide a cylindrical brush. In this construction, a circular backing element 83 of channel section is provided and the wire fabric element is doubled about a core element within the channel corresponding to that of FIGURES 15 and 16. One or a plurality of turns of the fabric looped about the core may be wound into place. In this construction, it will be apparent that as the filamentary element comprising the core and having the fabric looped thereabout is wound into position in the channel, the filaments at the outer perimeter of the unit are spread apart. This is desirable in order to maintain uniformity of the spacing of the tip portions of the woven wire about the outer perimeter of the unit.

Figure 19:
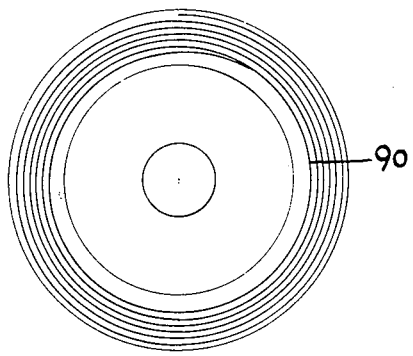
FIGURE 19 is a view of a brush formed by winding a sheet of wire fabric as a roll around a suitable drum or mandrel to provide a brush wherein abrading action may be effected either by pressing the work against the periphery of the roll or by pressing the work against a flat face of the roll.

In the construction shown in FIGURE 19, a strip of wire fabric with or without a plastic backing sheet is wound upon a drum or cylinder 90 in a series of spiral convolutions. The drum or cylinder serves as an adaptor which fits upon an appropriate driving shaft. The wire fabric within these convolutions, in rubbing against a work surface, acts as an abradant to cut away excess material. This construction may be used in forming rotary brushes of narrow width or for forming rotary brushes of broad width, that is, rotary drum type brushes.

Figure 20:
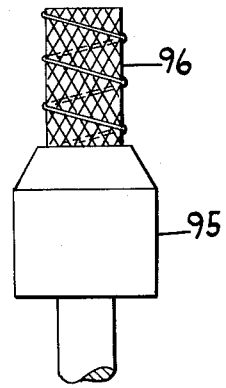
FIGURE 20 is a fragmentary view of a drill chuck wherein a roll of the embedded wire fabric as disclosed herein is inserted and clamped without the use of a cup element.

In FIGURE 20 is indicated a chuck element 95 which may be of a conventional design, such as is used in drill presses for holding drills. The butt portion of roll element 96 is directly inserted in this chuck and held by the jaws thereof without necessity of using a cup. This results in substantial economies of construction.

Figure 21:
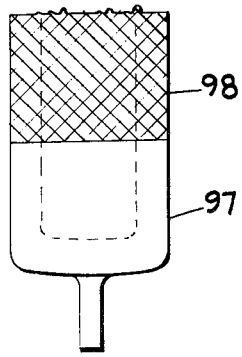
FIGURE 21 is a side view of a conventional type cup brush wherein a roll of the wire fabric is secured in the cup with a portion of the roll extending beyond the flanges of the cup.

FIGURE 21 indicates a rotary cup type brush wherein a cup element 97 is utilized to hold a hollow coil of wire fabric 98. The hollow coil of wire fabric may be secured to the cup element in a manner similar to that shown for end brushes in FIGURES 8 and 9, or by utilizing a plastic bonding medium as shown in FIGURES 11 and 14. Furthermore, the entire coil of wire fabric may be covered with a plastic bonding agent, such as that shown in FIGURE 16. The cup brush of FIGURE 21 can be embedded in plastic utilizing the method shown in FIGURE 10 wherein a plug of wax, wood, polyurethane foam, polystyrene foam or the like, is disposed in the hollow portion of the coil of wire fabric to preclude filling that space with plastic.

Figure 22:
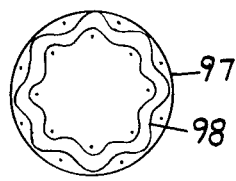
FIGURE 22 is an end view of the cup brush shown in FIGURE 21.

FIGURE 22 discloses an end view of the brush shown in FIGURE 21.

Although the invention has been specifically described hereinabove, it is not intended that the invention be limited solely thereto, but to include all of the variations and modifications falling within the scope of the appended claims.

I claim:

1. A power-driven cylindrical brush comprising a cup-type holder and fill material extending therefrom, said fill material consisting essentially of a woven wire fabric coiled about a central axis in such a manner as to present wire ends as abrading elements and being secured in said holder by means of a plastic medium, said plastic medium embedding said woven wire fabric at least to the top of said holder.

2. A power-driven cylindrical brush comprising a cup-type holder and fill material extending therefrom, said fill material consisting essentially of a woven wire fabric coiled about a central axis in such a manner as to present wire ends as abrading elements and being secured in said holder by means of a plastic medium, said plastic medium embedding said woven wire fabric substantially to the end thereof extending from said holder.

References Cited by the Examiner

UNITED STATES PATENTS

| | | | |
|---|---|---|---|
| 1,636,196 | 7/1927 | Robbins | 15—209.5 X |
| 1,638,804 | 8/1927 | Gottschalk | 15—225 |
| 1,874,475 | 8/1932 | Ellingham | 300—21 |
| 2,164,286 | 6/1939 | Stybr. | |
| 2,278,928 | 4/1942 | Herold | 15—198 |
| 2,318,016 | 5/1943 | Schlegel | 15—225 |
| 2,325,629 | 8/1943 | Peterson | 15—200 X |
| 2,343,310 | 3/1944 | Lohmann. | |
| 2,421,647 | 6/1947 | Peterson | 15—180 |
| 2,433,695 | 12/1947 | Hoffman | 15—236 X |
| 2,690,631 | 10/1954 | Peterson | 15—181 X |
| 2,950,495 | 8/1960 | Stingley | 15—179 |
| 2,982,983 | 5/1961 | Peterson | 15—180 |
| 2,995,401 | 8/1961 | Peterson | 300—21 |
| 3,007,188 | 11/1961 | Dolan | 15—180 |
| 3,142,080 | 7/1964 | Nelson | 15—180 X |
| 3,142,081 | 7/1964 | Hartz et al. | 15—179 |

FOREIGN PATENTS

| | | |
|---|---|---|
| 421,588 | 12/1910 | France. |
| 353,666 | 5/1922 | Germany. |

CHARLES A. WILLMUTH, *Primary Examiner.*